United States Patent
Mello et al.

(10) Patent No.: US 10,565,125 B2
(45) Date of Patent: Feb. 18, 2020

(54) VIRTUAL BLOCK ADDRESSES

(71) Applicant: HEWLETT PACKARD ENTERPRISE DEVELOPMENT LP, Houston, TX (US)

(72) Inventors: Curtis Mello, Berkley, MA (US); Michael Champigny, Barre, MA (US); Glenn S. Watkins, Northborough, MA (US); John Michael Czerkowicz, Wakefield, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/906,506

(22) Filed: Feb. 27, 2018

(65) Prior Publication Data

US 2019/0266100 A1 Aug. 29, 2019

(51) Int. Cl.
*G06F 12/10* (2016.01)
*G06F 12/1018* (2016.01)

(52) U.S. Cl.
CPC .. *G06F 12/1018* (2013.01); *G06F 2212/1041* (2013.01); *G06F 2212/657* (2013.01)

(58) Field of Classification Search
CPC ............................. G06F 12/02; G06F 12/1018
USPC .................................................. 711/202, 206
See application file for complete search history.

(56) References Cited

U.S. PATENT DOCUMENTS

| | | | |
|---|---|---|---|
| 8,572,319 B2 | 10/2013 | Kumagai et al. | |
| 9,047,015 B2 | 6/2015 | Gao et al. | |
| 10,380,026 B2 * | 8/2019 | Sundararaman | G06F 3/0619 |
| 2006/0053260 A1 * | 3/2006 | Kodama | G06F 11/1666 711/162 |
| 2011/0258225 A1 | 10/2011 | Taylor et al. | |
| 2012/0110259 A1 | 5/2012 | Mills et al. | |
| 2014/0172928 A1 * | 6/2014 | Faith | G06F 3/064 707/821 |
| 2014/0331011 A1 * | 11/2014 | Kesavan | G06F 3/0689 711/133 |
| 2015/0301743 A1 | 10/2015 | Nagao et al. | |
| 2016/0019004 A1 * | 1/2016 | Starks | G06F 3/0644 711/154 |
| 2016/0070652 A1 * | 3/2016 | Sundararaman | G06F 3/0619 711/154 |
| 2016/0203053 A1 * | 7/2016 | Talagala | H04L 67/1097 714/6.12 |
| 2017/0177224 A1 | 6/2017 | Glover et al. | |

OTHER PUBLICATIONS

Datacore, "Automated Storage Tiering," 2011, pp. 1-5 [online], Retrieved from the Internet on Sep. 13, 2017 at URL: <https://www.datacore.com/SSV-Webhelp/Automated_Storage_Tiering.htm>.

* cited by examiner

*Primary Examiner* — Pierre Miche Bataille
(74) *Attorney, Agent, or Firm* — Hewlett Packard Enterprise Patent Department

(57) ABSTRACT

Example implementations relate to objects in extents on a storage resource. In an example, an extent identifier is persisted to a storage allocation table, where the extent identifier locates an extent on a storage resource. An extent map tracks which objects in the extent are deallocated. A virtual block address is generated allocating an object to store data. The virtual block address may include a storage allocation table key that locates the extent identifier in the storage allocation table and an extent offset to locate the object within the extent.

20 Claims, 6 Drawing Sheets

VIRTUAL BLOCK ADDRESSES

BACKGROUND

Data may be stored in storage systems. Some storage systems may have multiple tiers, some of the tiers having different quality of service due to media type or other configuration details. Data may be migrated between different tiers.

BRIEF DESCRIPTION OF THE DRAWINGS

Various examples will be described below with reference to the following figures.

DETAILED DESCRIPTION

A storage system may store data on a storage resource that comprises hard disk drives, solid state disks, tape, and/or other persistent storage media. In some instances, the storage system may be a multi-tier storage system, where some of the tiers have different quality of service based on media type, RAID (Redundant Array of Independent Disks) configurations, and/or other configuration details. Data may be migrated between different tiers. For example, frequently accessed data may be stored in a hot tier, infrequently accessed data may be migrated to a cold tier, and rarely accessed data may be migrated to an archive tier.

A storage system may store data as objects. User accessible files and directories may be made up of multiple objects. Some storage systems may provide separation between a logical address of the objects and a physical address of the object on the underlying storage resource. Some storage systems may also utilize properties of objects, such as the hash signature of an object (e.g., using a hash function such as SHA-1, SHA-256, MD5, etc.), and various indexing and bookkeeping to provide data services such as inline deduplication.

However, as data is migrated between tiers, the physical address of the data objects may change. Such changes in the physical address would necessitate computationally expensive regeneration of the various logical addresses, indexes, and other data structures utilized in managing the storage system.

Accordingly, it may be useful to provide an extra level of indirection to reduce the amount of disruption caused by data migration. Examples disclosed herein may relate to, among other things, the use of a virtual block address that refers to a storage allocation table to identify an extent where a data object is stored. The virtual block address includes an extent offset to locate the data object within the extent. An extent header may track the allocation or deallocation state of data objects within the extent. By using the storage allocation table to link a virtual block address to an extent, an extent may be migrated and the storage allocation table updated without updating each virtual block address associated with the extent. Thus, the efficiency and performance of the storage system may be improved.

Figure 1:
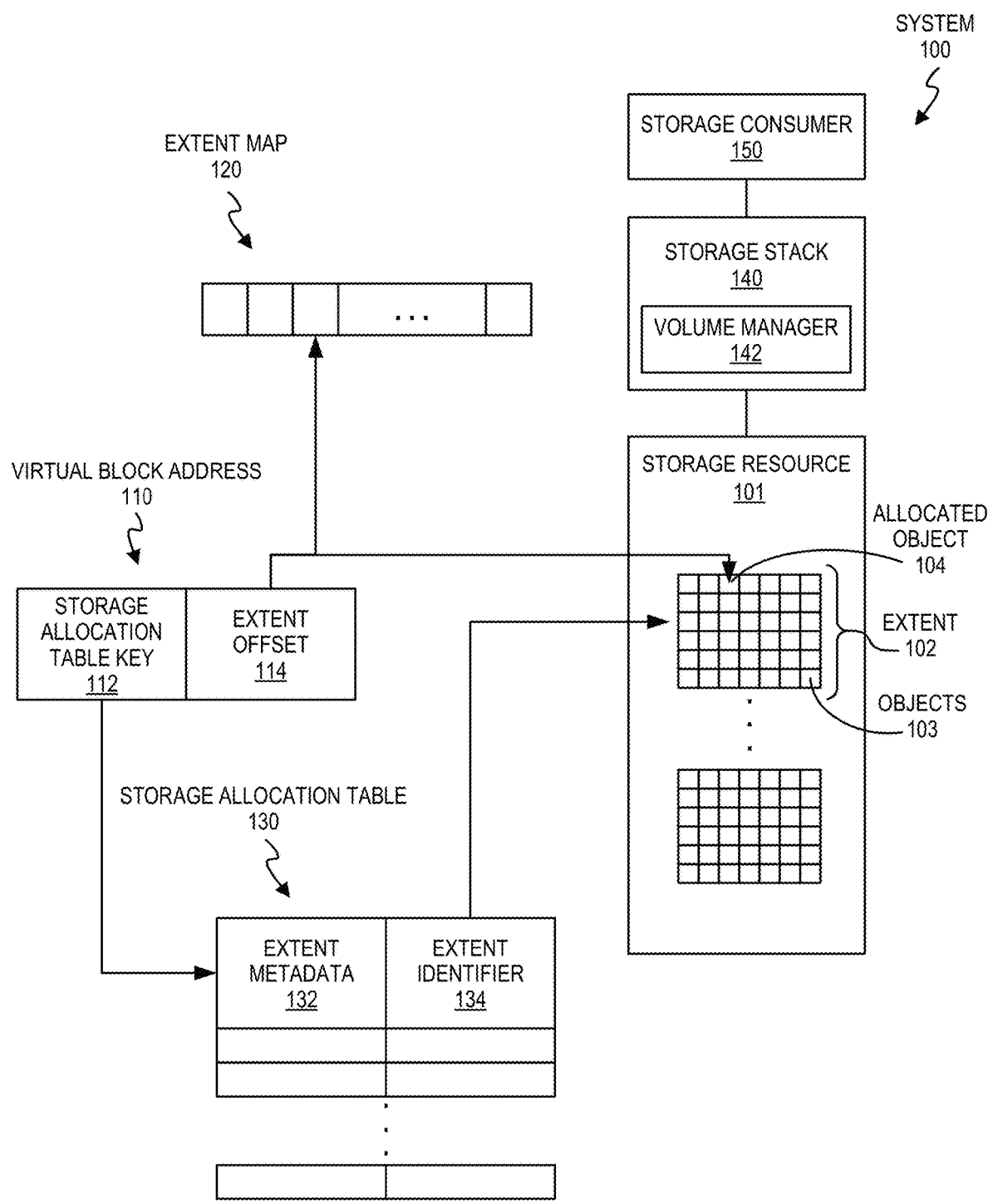
FIG. 1 illustrates example virtual identifiers for a storage system.

FIG. 1 illustrates data elements for the management of a storage resource 101. The storage resource 101 may be part of a system 100 (e.g., a server, a workstation, an appliance, a storage system, etc.), and may include hard disk drive(s), solid state drive(s), persistent memory, flash, or other forms of persistent storage. In some implementations, the storage resource 101 may have storage tiers that differ in terms of performance or other characteristics. For example, the storage tiers may perform differently corresponding to different media types (e.g., memory, flash, solid-state disk, hard disk drive, etc.), or RAID configurations, or other criteria.

In some implementations, the storage resource 101 may be part of a system 100 that provides software defined storage, and in particular, may form part of an object-based file system. In such a system, all data may be stored as objects in an object store. For example, a file (e.g., of a virtual machine on the system) may be represented by a plurality of objects. Each object may be identified by a signature (also referred to as an object fingerprint), which, in some implementations, may include a cryptographic hash of the content of the associated object. Objects may be hierarchically related to a root object in an object tree (e.g., a Merkle tree) or any other hierarchical arrangement (e.g., directed acyclic graphs, etc.). Leaf nodes of the tree may be data objects used to store opaque user data, and the root and internal nodes may be metadata objects used to store signatures of child objects and other attributes or information. The root object may have a signature derived from all the objects in the object tree. An object index data structure may include object records associated for each object, and each object record may include a signature of the object, a reference count, and a physical address of the object (such as a virtual block address described below). The reference count may keep track of the number of times the object is referenced, which may provide native deduplication to the system 100, among other features.

In some implementations, the storage resource 101 may be in communication with and managed by another component of the system 100, such as a storage stack 140 that may provide software defined storage intelligence. The storage stack 140 may include, for example, a volume manager 142. In some implementations, the storage stack 140 may include an object store to store and manage objects, per-virtual machine file system instances to generate artifacts involved in storing new data (e.g., signature, metadata object, etc.). Other implementations of the storage stack 140 may include additional or alternative components. The storage stack 140, in part or in whole, may be implemented as any combination of hardware and programming to implement the functionalities described herein. In some implementations, the storage stack 140 may be implemented in a virtual machine that executes on a hardware processing resource. In operation, the volume manager 142 may create and manage at least one virtual block address (VBA) 110, at least one extent map 120, and a storage allocation table (SAT) 130, to manage input/output (I/O) operations to the storage resource 101, as will be described below.

As referred to herein, programming may be processor executable instructions stored on a non-transitory machine-readable storage medium, and the hardware may include at least one processing resource to retrieve and/or execute those instructions. A processing resource may include a microcontroller, a microprocessor, central processing unit core(s), an application-specific integrated circuit (ASIC), a field programmable gate array (FPGA), etc. A non-transitory machine readable medium may include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, hardware may include electronic circuitry or logic for implementing functionality described herein.

Chunks of the storage resource 101 may be grouped together to form an extent 102. Storage resource 101 may be broken up into a plurality of extents, each of the extents having mutually exclusive chunks of the storage resource 101. A plurality of extents may be grouped together to create an extent pool. In some cases, different extents may be created from different tiers of the storage resource 101, and thus an extent pool may span different storage tiers. In an example implementation, all extents may be the same size (e.g., 8 megabyte extents) and any extent may be internally organized as equally sized objects 103 (e.g., 8 kilobyte objects), but different extents may have different object sizes. In other example implementations, different configurations of extents may be utilized (e.g., an extent with variable sized objects, etc.). The creation and management of extents may be handled by the volume manager 142 in some implementations.

As extents such as extent 102 are created, an extent identifier 134 associated with the extent 102 is persisted in the SAT 130 as a new SAT record. The extent identifier 134 may be a base physical address of the extent 102 in the storage resource 101. In cases where the extent 102 is among a plurality of extents, the SAT 130 may include a plurality of extent identifiers (in a plurality of SAT records), each corresponding to a respective extent of the plurality of extents.

In some implementations, corresponding extent metadata 132 also may be persisted together with the extent identifier 134, together forming the SAT record for extent 102. Extent metadata 132 may describe or include one or more properties of the extent 102, such as volume type, a storage tier identifier, object size, and/or an allocated object count. Volume type may refer to whether the extent stores user data or metadata (e.g., metadata may include file system metadata such as root and internal nodes in an object tree). A storage tier identifier may refer to which tier of the storage resource 101 the extent 102 was created from (e.g., primary, backup, hot, cold, hard disk drive, solid state, drive, or other tier identifiers). Object size may refer to the size of objects 103 of the extent 102 (e.g., 1 kb, 4 kb, 8 kb, etc.). Allocated object count may refer to the number of objects 103 in the extent 102 that contain valid data (e.g., as opposed to a deallocated object) and may be useful for determining how full the extent 102 is.

The extent map 120 also corresponds to the extent 102 and is a representation of the allocation state of objects within the extent 102. In some implementations, the extent map 120 also may be created when the extent 102 is created. In some implementations, the extent map 120 may be stored in a header of the extent 102. The extent map 120 may take the form of a bitmap, and may have at least as many bits as the extent 102 has objects. When the extent 102 is newly created and does not contain any valid objects, the extent map 120 represents an empty extent.

As an object of the storage from the extent 102 is allocated for writing data (e.g., object 104 for illustration purposes), the VBA 110 is generated and the extent map 120 is updated to track the allocation at a corresponding bit. The allocation request may come from a storage consumer 150, such as a virtual machine, an application, an operating system, etc. The VBA 110 includes a storage allocation table key (SAT key) 112 and an extent offset 114. The SAT key 112 locates the SAT record and thus the extent identifier 134 in the storage allocation table 130. For example, the SAT key 112 may be an index into the SAT 130. The extent offset 114 may be an offset or distance into the extent 102 from the base physical address of the extent 102.

In implementations where the storage stack 140 includes an object store, the volume manager 142 may pass the VBA 110 up the storage stack 140 to the object store to store the VBA 110 in an object record in an object index. Components of the system 100, including the storage consumer 150 or the storage stack 140 (e.g., a file system instance of the storage stack 140), can then write or read data using the object store, which in turn stores or looks up the VBA 110 in the object index to write or read data and to delete data, which includes deallocation of storage. For example, a read operation may use the SAT key 112 to look up the extent identifier 134 to determine the base address of the extent 102 and may use the extent offset 114 indexed from that base address to locate the object 104.

Figure 2:
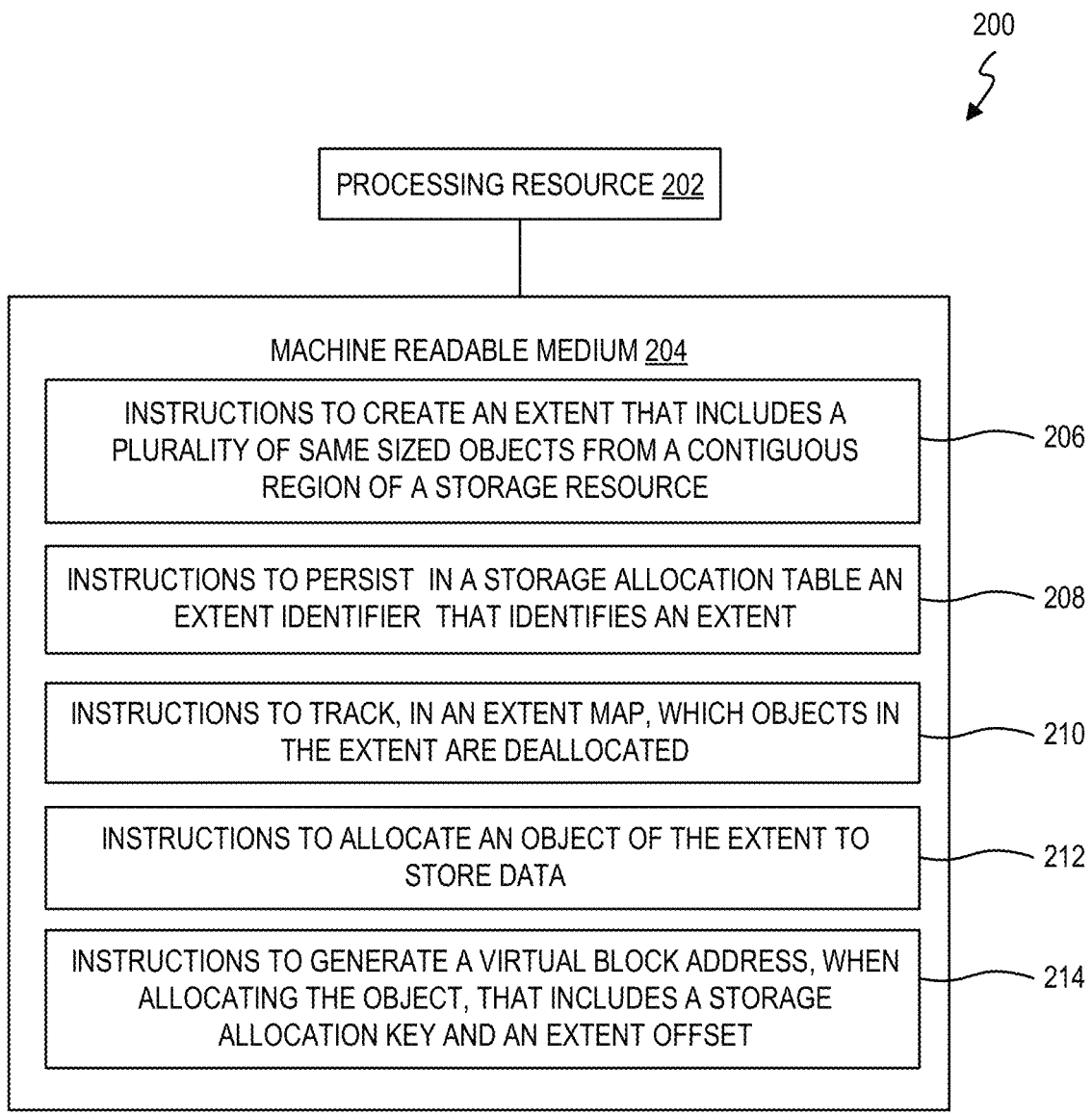
FIG. 2 is a block diagram depicting an example system that includes a non-transitory, machine readable medium encoded with example instructions to generate a virtual block address.

FIG. 2 depicts an example system 200 that includes a processing resource 202 coupled to a non-transitory, machine readable medium 204 encoded with example instructions 206-214. The processing resource 202 may include a microcontroller, a microprocessor, central processing unit core(s), an ASIC, an FPGA, and/or other hardware device suitable for retrieval and/or execution of instructions from the machine readable medium 204 to perform functions related to various examples. Additionally or alternatively, the processing resource 202 may include electronic circuitry for performing the functionality of the instructions described herein.

The machine readable medium 204 may be any medium suitable for storing executable instructions, such as RAM, ROM, EEPROM, flash memory, a hard disk drive, an optical disc, or the like. The machine readable medium 204 may be disposed within a system (e.g., a server or the like), in which case the executable instructions may be deemed "installed" on or "embedded" in the system. Alternatively, the machine readable medium 204 may be a portable (e.g., external) storage medium, and may be part of an "installation package."

As described further herein below, the machine readable medium 204 may be encoded with a set of executable instructions 206-214. It should be understood that all or part of the executable instructions and/or electronic circuits included within one box may, in alternate implementations, be included in a different box shown in the figures or in a different box not shown. In some examples, the instructions 206-214 may be useful in an environment like that of FIG. 1 for implementing aspects of the storage stack 140 or the volume manager 142 and may be useful for managing the storage resource 101.

Instructions 206, when executed, cause the processing resource 202 to create an extent 102 that includes a plurality of objects 103. For example, the extent 102 may be created from a plurality of objects 103 from a contiguous region of a storage resource 101. In some examples, the objects 103 may appear to be contiguous to instructions 206 owing to a mapping or translation by an underlying layer (e.g., a RAID management system) of objects that may or may not be contiguous on the storage resource 101.

Instructions 208, when executed, cause the processing resource 202 to persist (e.g., store) into a storage allocation table 130 an extent identifier 134 that identifies the extent 102. The storage allocation table 130 may be stored or persisted in persistent media such as a solid state disk. The extent identifier 134 may be a base physical address of the extent 102. In some implementations, instructions 208 may cause the processing resource 202 to store the extent identifier 134 together with extent metadata 132 in a record in the storage allocation table 130. Extent metadata 132 may include one or more of: an allocated object count of the extent 102, an object size for the extent 102, a storage tier of the extent 102, and whether the extent 102 stores user data or metadata.

Instructions 210, when executed, cause the processing resource 202 to track, in an extent map 120, which objects 103 in the extent 102 are deallocated. In some implementations, instructions 210 may also track, in the extent map 120, which objects in the extent 102 are allocated. For example, when the extent 102 is created in the first instance, the extent map 120 may be empty and thus accurately represent the newly formed extent 102. As objects in the extent 102 are deallocated and/or allocated, corresponding bits in the extent map 120 may be marked (e.g., bit flipped) accordingly. Thus, deallocated objects are known to be deallocated. As will be described below, an extent map 120 may also be in a partially consistent state, that is, with knowledge of the deallocated objects but not necessarily of the allocated objects.

Instructions 212, when executed, cause the processing resource 202 to allocate an object 104 of the extent 102 to store data. Instructions 212 may be responsive to a request from a storage consumer 150 to store data to the storage resource 101. In some implementations, instructions 212 include instructions to check the extent map 102 for a deallocated object to be used in allocating the object 104 to store data, and/or instructions to check the allocated object count of extent metadata 132 to find an extent with available storage. Also, instructions 212 may include triggering instructions 210 to mark the corresponding region of the extent map 120 to indicate that object 104 is in an allocated state.

Instructions 214, when executed, cause the processing resource 202 to generate a virtual block address 110 when allocating the object 104 (e.g., concurrent with or subsequent to execution of instructions 212). The VBA 110 includes a SAT key 112 to locate the extent identifier 134 in the SAT 130 and an extent offset 114 to locate the object 104 within the extent 102.

The storage stack 140 may write or store data to the allocated object 104 using the VBA 110 to address the object 104. More particularly, the SAT key 112 can be used to locate the extent identifier 134, which in turn locates the extent 102, and the extent offset 114 can be used to index into the extent 102.

Figure 3:
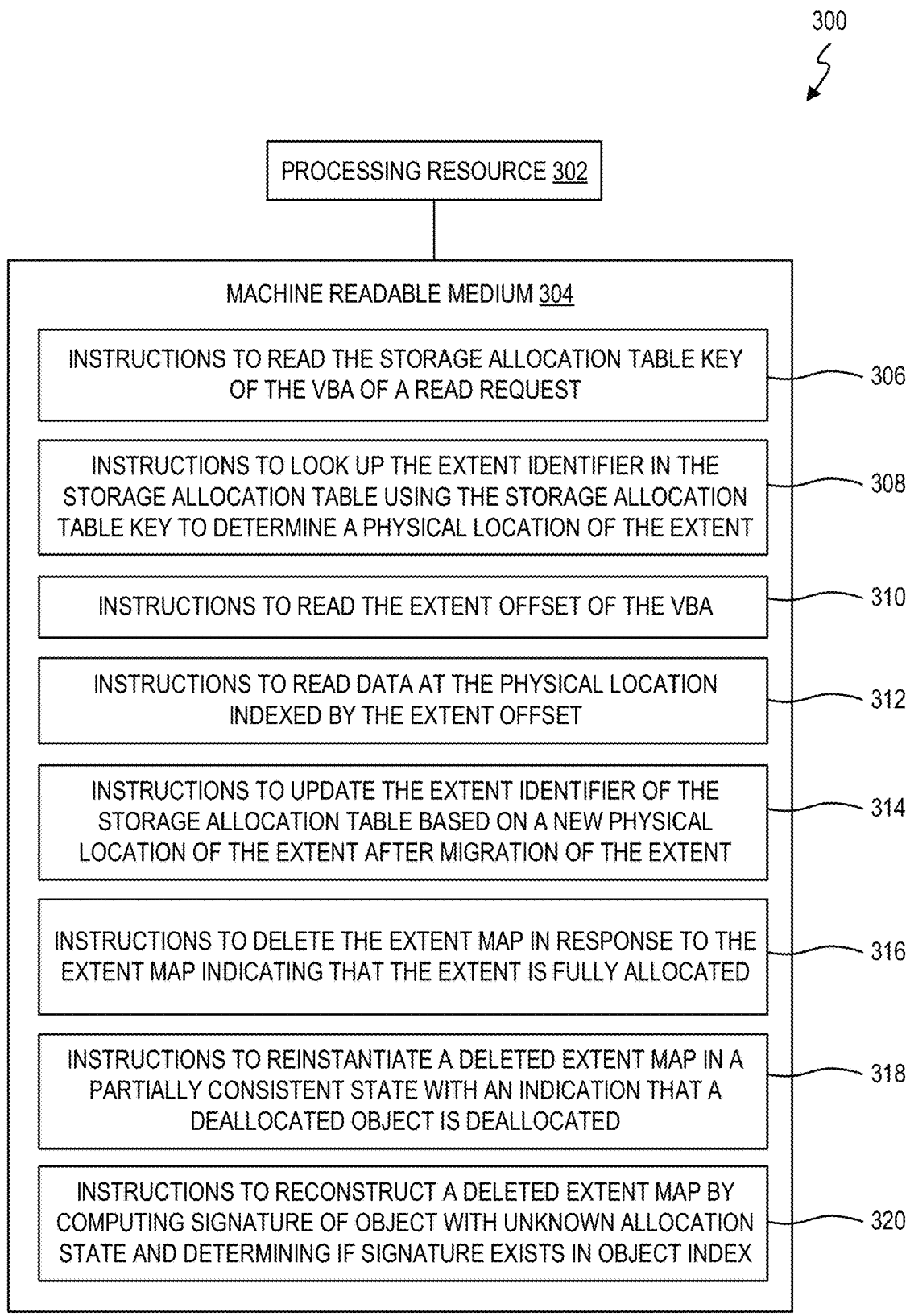
FIG. 3 is a block diagram depicting an example system that includes a non-transitory, machine readable medium encoded with example instructions for managing extent identifiers and extent maps.

FIG. 3 depicts an example system 300 that includes a processing resource 302 coupled to a non-transitory, machine readable medium 304 encoded with example instructions. The processing resource 302 and the machine readable medium 304 may be analogous in many respects to the processing resource 202 and the machine readable medium 204, respectively.

The machine readable medium 304 may be encoded with a set of executable instructions 306-320. It should be understood that part or all of the executable instructions and/or electronic circuits included within one box may, in alternate implementations, be included in a different box shown in the figures or in a different box not shown. Some implementations may include more or fewer instructions than are shown in FIG. 3. In some implementations, one or more of the instructions 306-320 may operate in combination (e.g., sequentially or concurrently) with one or more of the instructions 206-214 of FIG. 2. In some implementations, the instructions 306-320 may implement various aspects of storage stack 140 or the volume manager 142 of FIG. 1 and may be useful for managing the storage resource 101.

Instructions 306-312 may be useful for loading or reading previously stored data from the storage resource 101. For example, instructions 306-312 may be executed in response to a read request (e.g., from an object store servicing a storage consumer 150) that includes a VBA. The following description of instructions 306-312 will be illustrated by an example read request that includes VBA 110 to read object 104 (which may have been previously allocated and written using instructions 206-214 described above).

Instructions 306, when executed, cause the processing resource 302 to read the storage allocation table key 112 of the VBA 110 of the read request. Instructions 308, when executed, cause the processing resource 302 to look up the extent identifier 134 in the storage allocation table 130 using the SAT key 112. For example, the SAT key 112 may be an index into the SAT 130 where the extent identifier 134 is stored. By looking up the extent identifier 134, instructions 306 determine a physical location (e.g., base address) of the extent 102.

Instructions 310, when executed, cause the processing resource 302 to read the extent offset 114 of the VBA 110. Instructions 312, when executed, cause the processing resource 302 to read data at the physical location determined from the extent identifier 134 indexed by the extent offset 114. In other words, instructions 312 use the extent identifier 134 and the extent offset 114 to locate the object 104 and read the data stored therein.

In some implementations, a tier management operation may cause an extent to move to a different storage tier. For example, the tier management operation may be executed by a tiering engine component of the storage stack 140. An extent may be moved to a faster performance tier (also referred to as promotion) or to a slower performance tier (also referred to as demotion).

Instructions 314 may be executed in coordination with such a tier management operation. In an illustration where extent 102 is migrated, instructions 314 may cause the processor 302 to update the extent identifier 134 and any associated extent metadata 132 in the SAT 130 based on a new physical location of the extent 102 after migration to a different tier of the storage resource 101, without updating the VBA. In some implementations, instructions 314 may include instructions to allocate an empty extent in the destination tier, instructions to then copy data objects from the source tier extent to the new destination tier extent, and instructions to update the extent identifier to reflect the new destination tier extent.

By virtue of updating the extent identifier 134, data may be migrated without updating a large amount of in-memory or persisted references to the data objects, such as individual references for each object (e.g., the VBA in each object record in an object index for the objects of the migrated extent).

Instructions 316, when executed, may cause the processing resource 302 to delete the extent map 120 when the extent map 120 or allocated object count indicates that the extent 102 is fully allocated (that is, the extent 102 is fully written to by valid data and contains no further space for new data). For example, in an implementation where an extent map 120 is stored in memory, the extent map 120 may be evicted to free memory resources.

In some implementations, it may be useful to evict an extent map 120 to free memory resources even if the extent map 120 is not fully allocated. In such cases, an in-memory extent map 120 may be copied to persistent storage (e.g., disk) before being evicted.

In some cases, a deallocation request may be received (e.g., by the storage stack 140, as part of garbage collection operations, etc.) that is meant to release storage that is allocated to data, such as object 104. Deallocated storage, and the corresponding VBA, can then be used again to fulfill new allocation and data store operations. If an extent map exists for the extent in which an object is to be deallocated, the region of the extent map corresponding to the deallocated object may be marked to indicate deallocation.

If an extent was fully allocated and then the corresponding extent map was deleted (e.g., via instructions 316), instructions 318 may be executed to cause the processing resource 302 to respond to the deallocation request by reinstantiating the extent map in a partially consistent state with an indication that the deallocated object is deallocated. For example, reinstantiating a partially consistent extent map may include creating a new extent map where all the objects are marked as allocated even if some objects are in a deallocated state, in order to prevent accidental overwriting of objects. Thereafter, deallocation requests are marked in the extent map. Thus, new allocation requests can be fulfilled by objects with a known deallocation state but not by objects with an unknown deallocated state (marked as allocated regardless of actual state) in a partially consistent extent map.

It may be useful to convert a partially consistent extent map to a fully consistent extent map for certain storage management operations. In some implementations, the state of an extent map may be restored from a persisted copy.

In yet other implementations, instructions 320 may be executed to reconstruct a deleted extent map 120. For example, instructions 320 may be useful in a system where a storage stack 140 implements an object-based file system with an object store that manages objects identifiable by a signature (e.g., a hash of the object) stored in an object index, as described above. Instructions 320 reinstantiates the extent map, and for each object in the extent map 120 with an unknown allocation state, instructions 320 cause the processing resource 302 to read that object, compute a signature for that object (e.g., compute a cryptographic hash of the object), and determine whether that signature exists in an object index that includes signatures of all valid objects. Instructions 320 cause the processing resource 302 to respond to the signature not existing in the object index by updating the extent map 120 at an offset corresponding to that object to indicate that that object is deallocated. Similarly, instructions 320 cause the processing resource 302 to respond to the signature existing in the object index by updating the extent map 120 at an offset corresponding to that object to indicate that that object is allocated.

In some implementations, instructions 320 may be executed when a storage management operation involves a fully consistent extent map. For example, extents may undergo compaction when fragmented or for more efficient tier migration. In such cases and in an object-based file system, moving objects from one place in a source extent to another place in a destination extent during the compaction may involve updating the VBAs in the object index because the offset may change when moving the objects, and updating the VBAs may involve finding valid objects in the first instance. To find valid objects, the processing resource 302 may execute at least part of instructions 320 to calculate the signature for each object and look up the signature in the object index as described above. Valid objects with existing signatures can then have corresponding VBAs and SAT extent identifier updated to reflect the post-compaction physical location.

In other scenarios, instructions 320 may be executed opportunistically. For example, low-grade storage tiers (e.g., cold tier, hard drive tier, backup tier, etc.) may store data as a result of tier migration rather than directly from storage consumers 150 (e.g., virtual machines, hosts, etc.). To avoid excess resource consumption, it may be useful to not persist extent maps for the large number of extents stored on these low-grade tiers. Instead, instructions 320 may be executed to generate fully consistent extent maps on an as-needed basis when triggered by operations that involve fully consistent extent maps, such as compaction, tier migration, or promotion.

Figure 4:
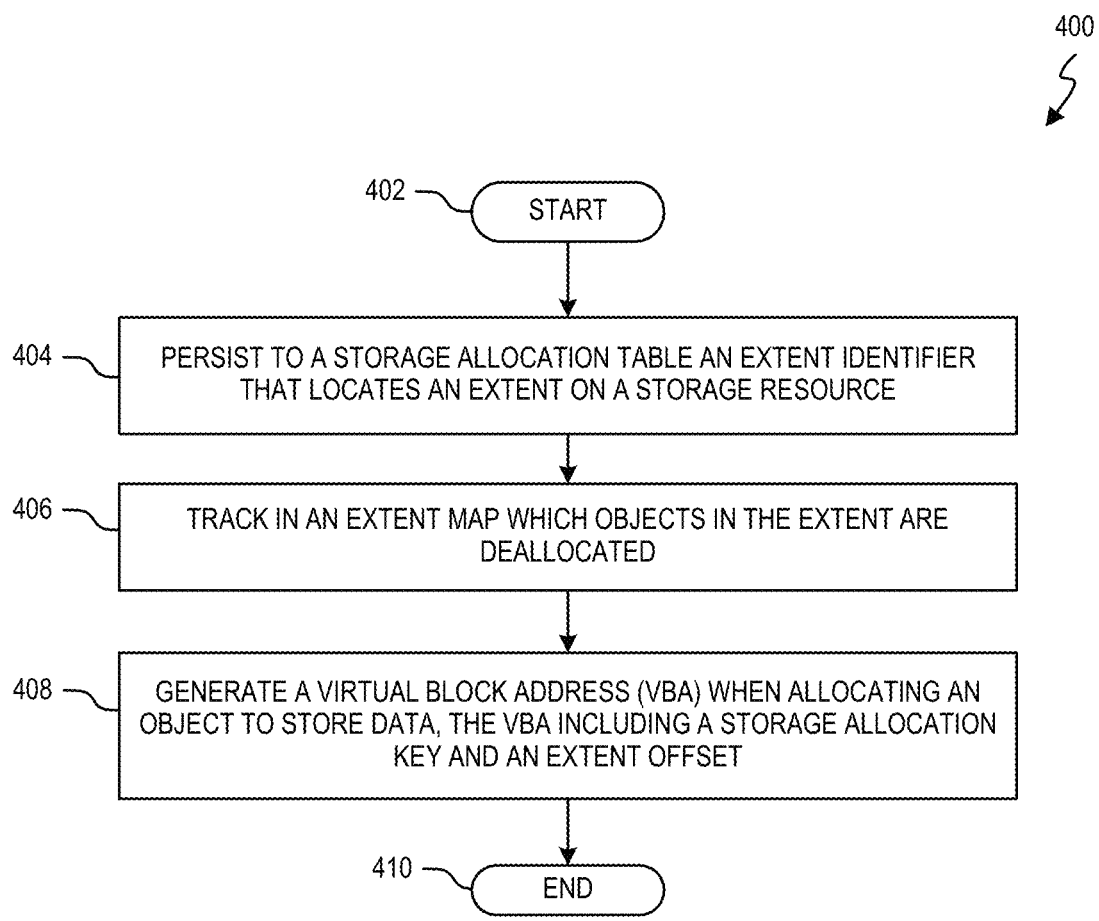
FIG. 4 is a flow diagram depicting an example method that generates a virtual block address.
Figure 5:
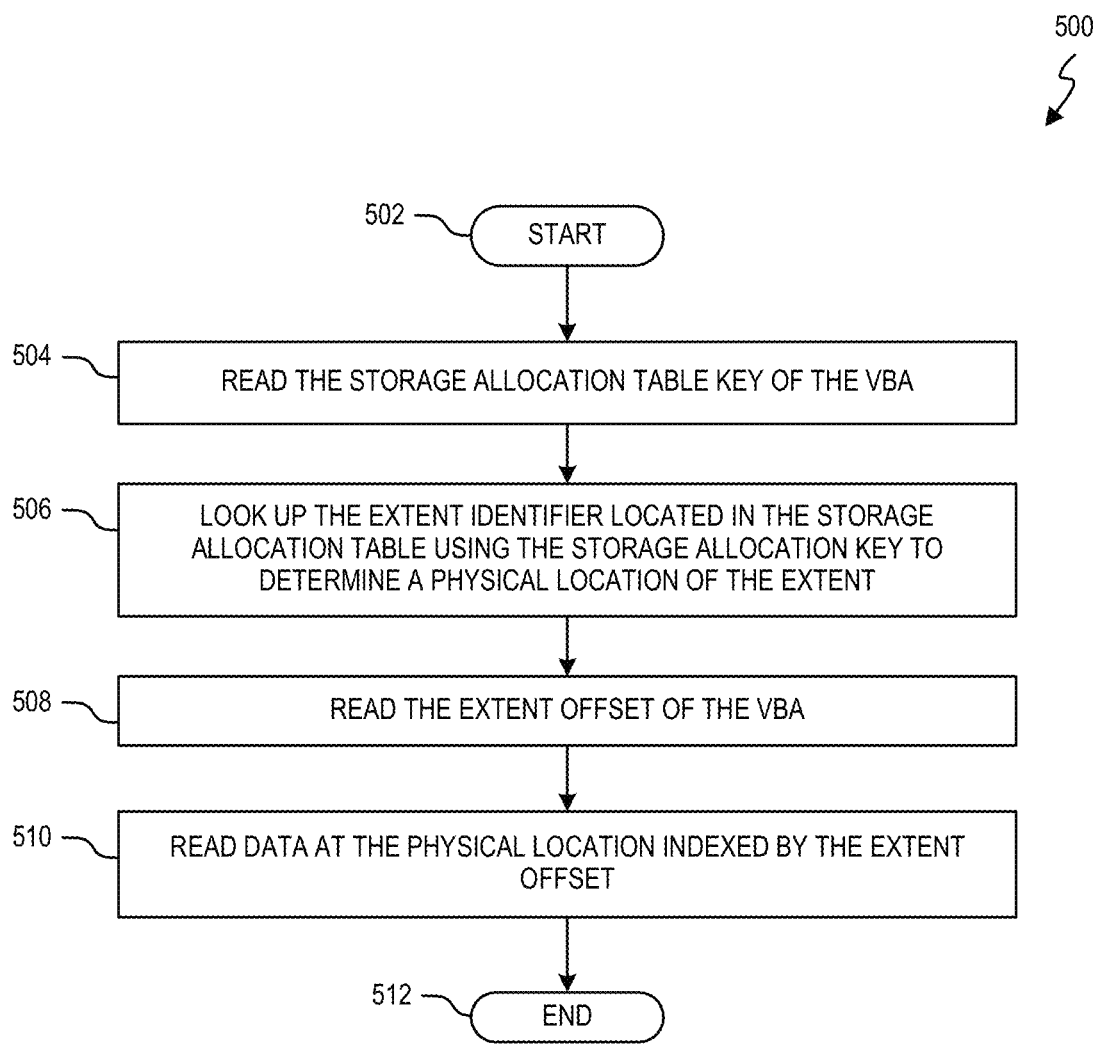
FIG. 5 is a flow diagram depicting an example method that reads data based on a virtual block address.
Figure 6:
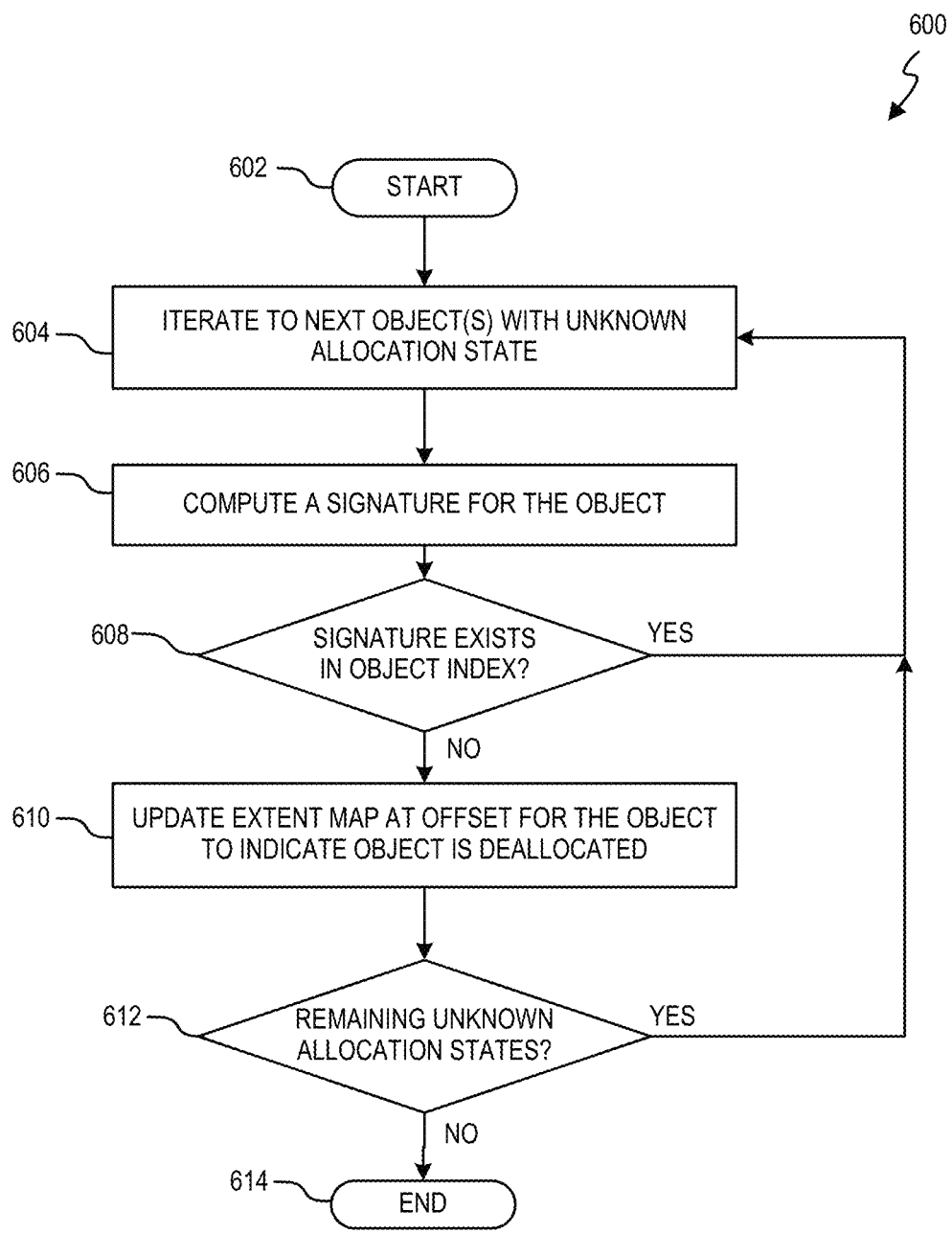
FIG. 6 is a flow diagram depicting an example method for reconstructing an extent map.

FIGS. 4-6 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat.

The methods may be implemented in the form of executable instructions stored on a machine readable medium and executed by a processing resource and/or in the form of electronic circuitry. For example, the methods below may be performed in part or in whole by a system such as system 200 or 300 that includes a processing resource or by a storage stack 140, and a volume manager 142 in some implementations, that is executed by a processing resource.

FIG. 4 is a flow diagram depicting an example method 400 that generates a virtual block address. The method 400 starts at block 402 and continues to block 404 where a processing resource persists, to a storage allocation table 130, an extent identifier 134 that locates an extent 102 on a storage resource 101. An extent 102 may include a plurality of objects 103 from a contiguous region of the storage resource 101. In some implementations, non-contiguous objects may be utilized.

At block 406, the processing resource tracks in an extent map 120 which objects 104 in the extent 102 are deallocated. At block 408, the processing resource generates a VBA 110 when allocating an object 104 to store data. The VBA 110 includes a storage allocation table key 112 that locates the extent identifier 134 in the storage allocation table 130, and an extent offset 114 to locate the object 104 within the extent 102. In some implementations, block 406 also includes verifying that the extent 102 has available deallocated blocks. At block 406, the method 400 ends.

FIG. 5 is a flow diagram depicting an example method 500 that reads data based on a virtual block address. Method 500 may be performed in response to a request to read data at a VBA 110. The method 500 starts at block 502 and continues to block 504 where the processing resource reads the SAT key 112 of the VBA 110. At block 506, the processing resource looks up the extent identifier 134 located in the SAT 130 using the SAT key 112 read from the VBA 110 to determine a physical location of the extent. At block 508, the processing resource reads the extent offset 114 of the VBA 110. At block 510, the processing resource reads data (e.g., object 104) at the physical location pointed to by the extent identifier 134, indexed by the extent offset 114. At block 512, the method 500 ends.

FIG. 6 is a flow diagram depicting an example method 600 for reconstructing an extent map. As the method 600 starts, the extent map may be first reinstantiated in a completely unknown state (all bits set to allocated), may be reinstantiated in a partially consistent state (i.e., pursuant to execution of instructions 318 described above), or may be loaded from a persisted copy with partially consistent state (some bits set to a known deallocated state). The method 600 starts at block 602 and continues to block 604 where a processing resource begins to iterate through each object in an extent map with an unknown allocation state. For example, iterating through objects may involve iterating through objects corresponding to bits in the extent map that are not in a deallocated state. In some implementations, iterating through objects with unknown allocation state may include iterating through VBAs associated with an extent and determining whether the VBA and object addressed by the VBA are valid, as will be described below, until the number of valid VBAs found equals the allocated object count included in extent metadata 132.

At block 606, the processing resource computes a signature for the object with unknown allocation state by, for example, calculating a cryptographic hash of the object. At block 608, the processing resource determines whether the signature exists in an object index that includes signatures of all valid objects. If the signature does exist in the object index ("YES" at block 608), the corresponding bit of the extent map can remain marked as allocated, and the method 600 returns to block 604 to iterate to the next object with unknown allocation state. If the signature does not exist in the object index ("NO" at block 608), method 600 proceeds to block 610 where the processing resource updates the extent map 120 at an offset corresponding to the object of the current iteration to indicate that that object is deallocated.

At block 612, the processing resource determines if there are any remaining objects with unknown allocation states, and returns to block 604 if there are such remaining objects ("YES" at block 612) or proceeds to the end of method 600 if there are no such remaining objects ("NO" at block 612). At the end of method 600, the extent map may be deemed fully consistent.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
 a processing resource;
 a storage resource; and
 a non-transitory machine readable medium storing instructions that, when executed, cause the processing resource to:
  create an extent that includes a plurality of objects from the storage resource,
  persist in a storage allocation table an extent identifier that identifies the extent,
  track, in an extent map, which objects in the extent are deallocated,
  allocate an object of the extent to store data, and
  generate a virtual block address (VBA) when allocating the object, the VBA including:
   a storage allocation table key to locate the extent identifier in the storage allocation table, and
   an extent offset to locate the object within the extent identified by the extent identifier located by the storage allocation table key.

2. The system of claim 1, wherein the non-transitory machine readable medium stores instructions that, when executed, cause the processing resource to:
 in response to a read request that includes the VBA,
  read the storage allocation table key of the VBA,
  look up the extent identifier in the storage allocation table using the storage allocation table key to determine a physical location of the extent,
  read the extent offset of the VBA, and
  read data at the physical location indexed by the extent offset.

3. The system of claim 1, wherein
 the storage resource includes a plurality of tiers having different performance characteristics, and
 the non-transitory machine readable medium stores instructions that, when executed, cause the processing resource to update the extent identifier in the storage allocation table based on a new physical location of the extent after migration of the extent to a different tier of the storage resource without updating the VBA.

4. The system of claim 1, wherein the non-transitory machine readable medium stores instructions that, when executed, cause the processing resource to delete the extent map in response to the extent map indicating that the extent is fully allocated.

5. The system of claim 4, wherein the non-transitory machine readable medium stores instructions that, when executed, cause the processing resource to, in response to a deallocation request to deallocate a deallocated object of the extent after the extent was fully allocated and the extent map was deleted, reinstantiate the extent map in a partially consistent state with an indication that the deallocated object is deallocated.

6. The system of claim 1, wherein the extent identifier and extent metadata are included together in a record in the storage allocation table, and the extent metadata includes an allocated object count of the extent, an object size for the extent, a storage tier of the extent, and whether the extent stores user data or metadata.

7. The system of claim 1, wherein
 the extent is among a plurality of extents corresponding to mutually exclusive chunks of the storage resource, and
 the storage allocation table includes a plurality of extent identifiers each corresponding to a respective extent of the plurality of extents.

8. The system of claim 1, wherein the non-transitory machine readable medium stores instructions that, when executed, cause the processing resource to:
 track, in the extent map, which objects in the extent are allocated, and
 check the extent map for a deallocated object to be used in allocating the object to store data.

9. The system of claim 1, wherein the non-transitory machine readable medium stores instructions for reconstructing the extent map after the extent map has been deleted, the instructions for reconstructing the extent map causing the processing resource to process each object with unknown allocation state in the extent map by:
 computing a hash for the each object with unknown allocation state,
 determining whether the hash exists in an object index that includes hashes of all valid objects, and responsive to a determination that the hash does not exist in the object index, updating the extent map at an offset corresponding to the each object to indicate the each object is deallocated.

10. A method comprising:

persisting to a storage allocation table, by a processing resource, an extent identifier that locates an extent on a storage resource, the extent including a plurality of objects from the storage resource;

tracking in an extent map, by the processing resource, which objects in the extent are deallocated; and generating, by the processing resource, a virtual block address (VBA) when allocating an object to store data, the VBA including:
- a storage allocation table key that locates the extent identifier in the storage allocation table, and
- an extent offset to locate the object within the extent.

11. The method of claim 10, further comprising, in response to a read request that includes the VBA:

reading the storage allocation table key of the VBA;

looking up the extent identifier located in the storage allocation table using the storage allocation table key read from the VBA to determine a physical location of the extent;

reading the extent offset of the VBA, and reading data at the physical location indexed by the extent offset.

12. The method of claim 10, further comprising, for each object with unknown allocation state in the extent map:

computing a signature for the each object, determining whether the signature exists in an object index that includes signatures of all valid objects, and responsive to the signature not existing in the object index, updating the extent map at an offset corresponding to the each object to indicate the each object is deallocated.

13. A non-transitory machine readable medium storing instructions executable by a processing resource of a system having a storage resource, the non-transitory machine readable medium comprising:

instructions to add to a storage allocation table an extent identifier that locates an extent on a storage resource, the extent including a plurality of objects from the storage resource;

instructions to track, in an extent map, which objects in the extent are deallocated; and instructions to generate a virtual block address (VBA) when allocating an object to store data, the VBA including:
- a storage allocation table key that locates the extent identifier in the storage allocation table, and
- an extent offset to locate the object within the extent.

14. The non-transitory machine readable medium of claim 13, further comprising instructions to, in response to a read request that includes the VBA:

read the storage allocation table key of the VBA, look up the extent identifier in the storage allocation table using the storage allocation table key read from the VBA to determine a physical location of the extent, read the extent offset of the VBA, and read data at the physical location indexed by the extent offset.

15. The non-transitory machine readable medium of claim 13, further comprising:

instructions to migrate the extent from a source tier to a destination tier of the storage resource; and instructions to update the extent identifier in the storage allocation table based on a new physical location of the extent in the destination tier without updating the VBA.

16. The non-transitory machine readable medium of claim 13, further comprising instructions to delete the extent map in response to the extent map indicating that the extent is fully allocated.

17. The non-transitory machine readable medium of claim 16, further comprising instructions to, in response to a deallocation request to deallocate a deallocated object of the extent after the extent was fully allocated and the extent map was deleted, reinstantiate the extent map in a partially consistent state with an indication that the deallocated object is deallocated.

18. The non-transitory machine readable medium of claim 13, wherein the extent is among a plurality of extents corresponding to mutually exclusive chunks of the storage resource, and the storage allocation table includes a plurality of extent identifiers each corresponding to a respective extent of the plurality of extents.

19. The non-transitory machine readable medium of claim 13, further comprising:

instructions to track, in the extent map, which objects in the extent are allocated; and instructions to check the extent map for a deallocated object to be used in allocating the object to store data.

20. The non-transitory machine readable medium of claim 13, further comprising:

instructions to reconstruct the extent map after the extent map has been deleted, including instructions to, for each object with unknown allocation state in the extent map:

compute a signature for the each object, determine whether the signature exists in an object index that includes signatures of all valid objects, and responsive to the signature not existing in the object index, update the extent map at an offset corresponding to the each object to indicate the each object is deallocated.

* * * * *